US009980224B2

(12) United States Patent
Saed et al.

(10) Patent No.: US 9,980,224 B2
(45) Date of Patent: May 22, 2018

(54) DETERMINING INACTIVITY TIMEOUT USING DISTRIBUTED COORDINATION FUNCTION

(71) Applicant: QUALCOMM Incorporated, San Diego, CA (US)

(72) Inventors: Steve I. Saed, San Diego, CA (US); Linzhao Ye, San Diego, CA (US); Anjana Badrinarayanan, San Diego, CA (US); Mark Tung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 14/678,798

(22) Filed: Apr. 3, 2015

(65) Prior Publication Data

US 2016/0295509 A1    Oct. 6, 2016

(51) Int. Cl.
*H04W 52/02* (2009.01)
*H04W 28/02* (2009.01)

(52) U.S. Cl.
CPC ... *H04W 52/0225* (2013.01); *H04W 28/0221* (2013.01); *H04W 52/0235* (2013.01);
(Continued)

(58) Field of Classification Search
CPC ... H04L 12/4015; H04L 12/413; H04L 47/10; H04L 47/11; H04L 47/14; H04W 28/02;
(Continued)

(56) References Cited

U.S. PATENT DOCUMENTS 5,838,688 A * 11/1998 Kadambi ............. H04L 12/413
                                                            370/445
7,180,905 B2 * 2/2007 Benveniste .......... H04W 74/02
                                                            370/317
(Continued)

FOREIGN PATENT DOCUMENTS

CN     104703233 A    6/2015
EP      1592176 A1   11/2005
(Continued)

OTHER PUBLICATIONS

Bhagoria et al., An Approach for Improving Performance of Back off Algorithm, May 2012, International Journal of Computer Applications (0975-8887), vol. 46, No. 5, pp. 46-49.*
(Continued)

*Primary Examiner* — Eric Nowlin
(74) *Attorney, Agent, or Firm* — Holland & Hart LLP

(57) ABSTRACT

Methods, systems, and devices are described for power management in wireless devices. Power saving for a device of a wireless network may be improved by appropriately setting an inactivity timeout (ITO), and thus the amount of time, after a last transmission or reception of data traffic, that the device remains in an awake mode listening for more data traffic before the device enters a sleep mode. Distributed coordinated function (DCF) information may be used for determining the ITO. For example, the DCF information may be used to determine a channel congestion metric, which may be used to set the ITO for the device.

20 Claims, 11 Drawing Sheets

(52) U.S. Cl.
CPC ......... *H04W 52/0258* (2013.01); *Y02D 70/00* (2018.01); *Y02D 70/142* (2018.01); *Y02D 70/22* (2018.01)

(58) Field of Classification Search
CPC ......... H04W 28/0221; H04W 28/0289; H04W 28/18; H04W 52/0225; H04W 52/0235; H04W 56/00; H04W 74/002; H04W 74/02; H04W 74/085; H04W 84/12
See application file for complete search history.

(56) References Cited

U.S. PATENT DOCUMENTS

| | | | |
|---|---|---|---|
| 7,181,190 B2 | 2/2007 | Abhishek et al. | |
| 7,242,972 B2 | 7/2007 | Harris | |
| 7,277,415 B2* | 10/2007 | Benveniste | H04W 74/02 370/338 |
| 7,385,945 B1 | 6/2008 | Olson et al. | |
| 7,586,932 B2* | 9/2009 | Chou | H04L 12/413 370/445 |
| 7,664,089 B2* | 2/2010 | Zhao | H04W 74/02 370/338 |
| 7,773,625 B2* | 8/2010 | Benveniste | H04W 74/02 370/317 |
| 7,787,406 B2 | 8/2010 | Park et al. | |
| 7,983,231 B2* | 7/2011 | Benveniste | H04W 74/02 370/338 |
| 8,005,515 B1 | 8/2011 | Chhbra et al. | |
| 8,385,878 B2 | 2/2013 | Rao et al. | |
| 8,452,244 B2 | 5/2013 | Ren | |
| 8,971,229 B1 | 3/2015 | Yenganti et al. | |
| 9,277,532 B2* | 3/2016 | Guo | H04W 72/005 |
| 9,419,777 B2* | 8/2016 | Fang | H04L 5/14 |
| 9,756,568 B2* | 9/2017 | Huang-Fu | H04W 76/00 |
| 2003/0174665 A1* | 9/2003 | Benveniste | H04W 74/02 370/317 |
| 2003/0181204 A1* | 9/2003 | Benveniste | H04W 74/02 455/422.1 |
| 2004/0093421 A1 | 5/2004 | Peng et al. | |
| 2004/0259542 A1 | 12/2004 | Viitamaki et al. | |
| 2005/0025176 A1* | 2/2005 | Ko | H04W 74/085 370/448 |
| 2005/0059349 A1* | 3/2005 | Elliott | H04B 17/309 455/67.7 |
| 2005/0094558 A1* | 5/2005 | Lu | H04W 28/08 370/229 |
| 2005/0185666 A1* | 8/2005 | Raya | H04W 24/00 370/461 |
| 2005/0221869 A1 | 10/2005 | Liu et al. | |
| 2006/0072488 A1 | 4/2006 | Meier | |
| 2006/0205443 A1* | 9/2006 | Simoens | H04L 1/0003 455/574 |
| 2006/0234740 A1 | 10/2006 | Sakoda | |
| 2007/0155441 A1 | 7/2007 | Carbonaro | |
| 2007/0211749 A1* | 9/2007 | Benveniste | H04W 74/02 370/445 |
| 2008/0013515 A1* | 1/2008 | Benveniste | H04W 74/02 370/338 |
| 2008/0014959 A1* | 1/2008 | Karlsson | H04W 76/068 455/455 |
| 2008/0144493 A1 | 6/2008 | Yeh | |
| 2008/0171550 A1* | 7/2008 | Zhao | H04W 74/02 455/445 |
| 2009/0196212 A1* | 8/2009 | Wentink | H04W 52/0235 370/311 |
| 2009/0279466 A1* | 11/2009 | Ji | H04W 52/0232 370/311 |
| 2009/0303888 A1 | 12/2009 | Ariyur et al. | |
| 2010/0128645 A1* | 5/2010 | Lin | H04W 52/0251 370/311 |
| 2010/0144363 A1 | 6/2010 | De Rosa et al. | |
| 2010/0296495 A1 | 11/2010 | Iino et al. | |
| 2011/0044303 A1* | 2/2011 | Ji | H04W 74/085 370/338 |
| 2011/0058510 A1 | 3/2011 | Thomas et al. | |
| 2011/0122780 A1 | 5/2011 | Nieminen et al. | |
| 2011/0158144 A1* | 6/2011 | Sung | H04W 52/0216 370/311 |
| 2013/0077549 A1 | 3/2013 | Chhabra et al. | |
| 2013/0094413 A1* | 4/2013 | Turunen | H04W 52/0206 370/311 |
| 2013/0122971 A1 | 5/2013 | Thomas et al. | |
| 2013/0148501 A1* | 6/2013 | He | H04L 47/14 370/235 |
| 2013/0230028 A1 | 9/2013 | Calcev | |
| 2013/0235720 A1 | 9/2013 | Wang et al. | |
| 2013/0235773 A1 | 9/2013 | Wang et al. | |
| 2013/0272455 A1 | 10/2013 | Homchaudhuri et al. | |
| 2014/0016567 A1 | 1/2014 | Lu et al. | |
| 2014/0064166 A1 | 3/2014 | Homchaudhuri et al. | |
| 2014/0078970 A1* | 3/2014 | Guo | H04W 72/005 370/329 |
| 2014/0153458 A1 | 6/2014 | Shrivastava et al. | |
| 2014/0153460 A1 | 6/2014 | Shrivastava et al. | |
| 2014/0169290 A1 | 6/2014 | Seok | |
| 2014/0254502 A1 | 9/2014 | Cai et al. | |
| 2014/0280901 A1 | 9/2014 | Balachandran et al. | |
| 2014/0328193 A1* | 11/2014 | Horn | H04W 24/00 370/252 |
| 2014/0376532 A1* | 12/2014 | Sun | H04W 74/0816 370/338 |
| 2015/0016309 A1* | 1/2015 | Fang | H04L 5/14 370/277 |
| 2015/0029933 A1 | 1/2015 | Park et al. | |
| 2015/0098374 A1* | 4/2015 | Homchaudhuri | H04W 52/0216 370/311 |
| 2015/0163828 A1 | 6/2015 | Vandwalle et al. | |
| 2015/0172958 A1* | 6/2015 | Allanki | H04W 48/06 370/235 |
| 2015/0230245 A1* | 8/2015 | Choi | H04W 74/0816 370/329 |
| 2016/0088567 A1 | 3/2016 | HomChaudhuri et al. | |
| 2017/0019750 A1* | 1/2017 | Palanisamy | H04W 76/066 |
| 2017/0055160 A1* | 2/2017 | Barriac | H04W 16/14 |
| 2017/0078076 A1* | 3/2017 | Fang | H04L 5/14 |
| 2017/0079068 A1* | 3/2017 | Ahmed | H04W 74/0816 |
| 2017/0094443 A1* | 3/2017 | Kim | H04W 4/005 |
| 2017/0094603 A1* | 3/2017 | Huang-Fu | H04W 52/0229 |
| 2017/0094707 A1* | 3/2017 | Lin | H04W 28/0289 |
| 2017/0303196 A1* | 10/2017 | Li | H04W 52/0212 |
| 2017/0311260 A1* | 10/2017 | Trainin | H04W 72/1278 |
| 2017/0325264 A1* | 11/2017 | Cherian | H04W 74/0816 |
| 2017/0332251 A1* | 11/2017 | Cave | H04W 36/30 |
| 2018/0013623 A1* | 1/2018 | Kazmi | H04L 41/0816 |

FOREIGN PATENT DOCUMENTS

| | | |
|---|---|---|
| EP | 2106192 A2 | 9/2009 |
| WO | WO-2008124041 A2 | 10/2008 |

OTHER PUBLICATIONS

Bianchi, Performance Analysis of the IEEE 802.11 Distributed Coordination Function, Mar. 2000, IEEE Journal on Selected Areas in Communications, vol. 18, No. 3, pp. 535-547.*

Deng et al., Contention Window Optimization for IEEE 802.11 DCF Access Control, Dec. 2008, IEEE Transactions on Wireless Communications, vol. 7, No. 12, pp. 5129-5135.*

Foh et al., Comments on IEEE 802.11 Saturation Throughput Analysis with Freezing of Backoff Counters, Feb. 2005, IEEE Communications Letters, vol. 9, No. 2, pp. 130-132.*

Xiao, Performance Analysis of IEEE 802.11e EDCF under Saturation Condition, Jul. 24, 2004, 2004 IEEE International Conference on IEEE Communications Society, Communications, pp. 170-174.*

Liang et al., A Novel Pause Count Backoff Algorithm for Channel access in IEEE 802.11 based Wireless LANs, Oct. 15, 2008, International Symposium on Computer Science and Its Applications, IEEE (Year: 2008).*

(56) References Cited

OTHER PUBLICATIONS

Romdhani L., et al., "AEDCF: Enhanced Service Differentiation for IEEE 802.11 Wireless Ad-Hoc Networks," INRIA, Sep. 2002, 26 Pages.
International Search Report and Written Opinion—PCT/US2014/056962—ISA/EPO—dated Dec. 5, 2014.
ISA/EPO, International Search Report and Written Opinion of the International Searching Authority, Int'l App. No. PCT/US2016/025370, dated Jun. 15, 2016, European Patent Office, Rijswijk, NL, 10 pgs.
Bhagoria et al., "An Approach for Improving Performance of Back off Algorithm", International Journal of Computer Applications, May 2012, vol. 46, No. 5, pp. 45-49.

* cited by examiner

DETERMINING INACTIVITY TIMEOUT USING DISTRIBUTED COORDINATION FUNCTION

BACKGROUND

Field of the Disclosure

The following relates generally to wireless communication, and more particularly to setting an inactivity timeout using distributed coordination function information.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi network (IEEE 802.11), may include an access point (AP) that may communicate with one or more stations (STAs) or mobile devices. The AP may be coupled to a network, such as the Internet, and enable a mobile device to communicate via the network (and/or communicate with other devices coupled to the access point).

WLAN systems may use channel sense multiple access (CSMA), in which devices or STAs sense channel conditions prior to accessing the channel. In WLAN systems, APs may be communicating with several or many other STAs concurrently, and therefore data transfers may be interrupted by periods where the AP is serving other STAs. A baseline power-saving algorithm may keep the STA awake for a fixed period of time after the last received/transmitted frame. However, a long fixed period will sacrifice power savings for performance, while a short fixed period will save power but sacrifice performance.

One approach is to use a packet arrival rate to adjust the period of time that the device remains in the awake mode after the last received/transmitted frame. The period of time may be referred to as inactivity time interval or inactivity timeout (ITO). The packet arrival rate, determined when the device is in the awake mode, may be used to guide the determination of the ITO. However, this approach suffers from a drawback that the packet arrival rate determination may be in error, for example, due to channel congestion.

A procedure known as the distributed coordination function (DCF) may allow multiple stations (STAs) to compete for access to the same channel while avoiding traffic collisions. The DCF may use CSMA to determine the availability of the medium to be accessed by STAs in a basic service set (BSS). Before any STA may transmit, the STA may wait one inter-frame spacing (IFS) plus a random backoff interval. If the medium is determine to be idle (i.e., available) during the backoff interval (timed with a backoff timer), the STA may access the medium and start transmission. If the medium is determined to be busy, the STA may wait for the medium to become idle, during which the STA may suspend or pause the backoff timer. The backoff interval may be generated as a random number within a range known as a contention window (CW). For each failed transmission attempt, the CW for the STA may be incremented to a next longer CW step until a maximum CW value is reached. When a transmission attempt is successful, the CW may be reset to a default value (e.g., a minimum CW value) for the next transmission.

SUMMARY

The described features generally relate to one or more improved systems, methods, and/or apparatuses for power management in wireless devices. More specifically, the described features generally relate to improving power saving for a device of a wireless network by adjusting the ITO, and thus the amount of time, after a last transmission or reception of data traffic, that the device remains in an awake mode listening for more data traffic before the device enters a sleep mode. The described features may be employed to improve power savings by taking into account distributed coordinated function (DCF) information for determining the ITO. The DCF information may be used to determine a channel congestion metric, which may be used to set the ITO for the device.

A method for wireless communication is described. The method may involve tracking distributed coordination function (DCF) operations of a wireless station to obtain historical DCF information. A channel congestion metric may be determined based at least in part on the historical DCF information. An inactivity timeout (ITO) for the wireless station may be set based at least in part on the channel congestion metric.

The ITO may be inversely proportional to a degree of channel congestion indicated by the channel congestion metric.

The historical DCF information may include historical contention window (CW) data for the wireless station.

Tracking the DCF operations may involve tracking a random backoff interval value for each of a plurality of prior CWs of the wireless station. Tracking the DCF operations also may involve determining a number of times a backoff timer is paused during transmission attempts for each of the plurality of prior CWs of the wireless station.

The method also may involve determining a channel congestion sample for each of the plurality of prior CWs based at least in part on the random backoff interval value and the determined number of times the backoff timer is paused. In such case, the channel congestion metric for the wireless station may be based at least in part on a plurality of the determined channel congestion samples.

The method further may involve associating each channel congestion sample with a timestamp of the corresponding CW. In such case, the ITO for the wireless station may be based at least in part on the plurality of the determined channel congestion samples, the corresponding timestamps of the congestion samples and a current timestamp.

The method may involve identifying a first contention window (CW) value associated with a previous successful transmission by the wireless station. A second CW value for an initial attempt of a subsequent transmission by the wireless station may be set based at least in part on the first CW value.

Setting the second CW value may involve decrementing to a next CW value relative to the first CW value.

An apparatus for wireless communication also is described. The apparatus may include a processor to track distributed coordination function (DCF) operations of a wireless station to obtain historical DCF information. The apparatus also may include a calculator to determine a channel congestion metric based at least in part on the historical DCF information. The apparatus further may include an inactivity timeout (ITO) manager to set an ITO for the wireless station based at least in part on the channel congestion metric. The apparatus may include these and other features to carry out the functions described above and further herein.

Another apparatus for wireless communication is described. The apparatus may include: means for tracking distributed coordination function (DCF) operations of a wireless station to obtain historical DCF information; means for determining a channel congestion metric based at least in part on the historical DCF information; and, means for setting an inactivity timeout (ITO) for the wireless station based at least in part on the channel congestion metric. The apparatus may include these and other features to carry out the functions described above and further herein.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The described features generally relate to improved systems, methods, or apparatuses for adaptively setting an inactivity timeout (ITO) for a device, such as a station (STA). Such an approach may avoid drawbacks associated with using a fixed (e.g., preset) ITO. A major contributor to a WLAN STA's power consumption may be time spent in idle-listen mode, which may be determined by a fixed ITO used in all channel conditions. However, when the medium is busy, using a fixed ITO may lead to either unnecessary power consumption by the STA if set too long or decreased performance for the STA if set too short.

As described herein, the ITO may be set adaptively using DCF information. DCF operations may be tracked to generate historical DCF information. The historical DCF information may be used to obtain, derive, calculate, generate or otherwise determine a channel congestion metric. The ITO may be set using the channel congestion metric. For example, the ITO may be set adaptively based at least in part on a number of previous retransmission attempts obtained from DCF historical data and a time value (e.g., a number of time slots) during which a backoff timer was paused or a pause count of the backoff timer.

Adaptively setting the ITO as described herein may conserve power by having the STA enter the sleep mode sooner when the medium is busier, while promoting performance (e.g., throughput/medium utilization) by having the STA stay awake longer when the medium is less busy.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
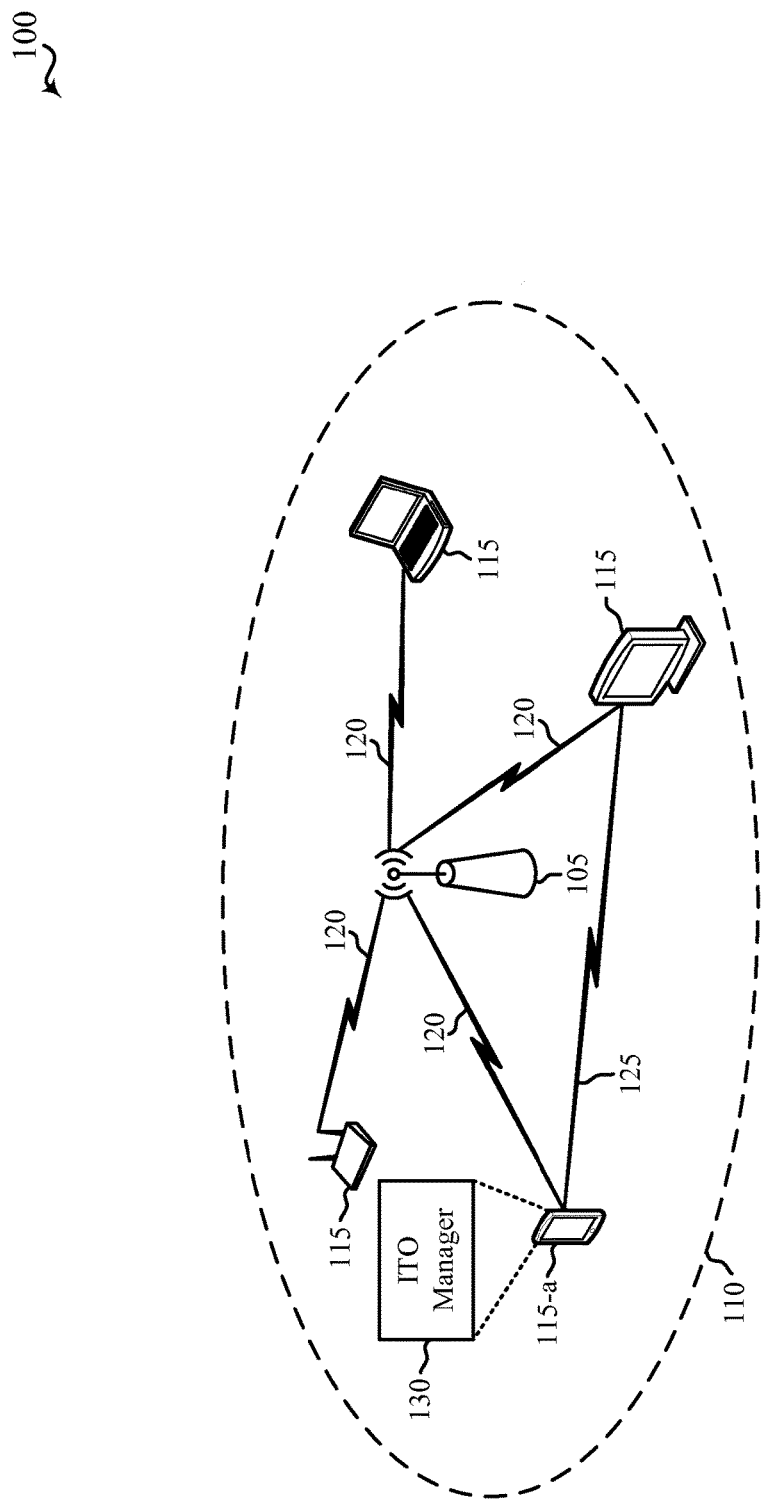
FIG. 1 shows a block diagram of a wireless communication system, in accordance with various aspects of the present disclosure.

Referring first to FIG. 1, a block diagram illustrates an example of a WLAN 100 such as, e.g., a network implementing at least one of the IEEE 802.11 family of standards. The WLAN 100 may include an access point (AP) 105 and one or more wireless devices or stations (STAs) 115, such as mobile stations, personal digital assistants (PDAs), other handheld devices, netbooks, notebook computers, tablet computers, laptops, display devices (e.g., TVs, computer monitors, etc.), printers, etc. While one AP 105 is illustrated, the WLAN 100 may have multiple APs 105. Each of the wireless STAs 115, which may also be referred to as mobile stations (MSs), mobile devices, access terminals (ATs), user equipment (UE), subscriber stations (SSs), or subscriber units, may associate and communicate with the AP 105 via a communication link 120. The AP 105 has a geographic coverage area 110 such that wireless STAs 115 within that area may typically communicate with the AP 105. The wireless STAs 115 may be dispersed throughout the geographic coverage area 110. Each wireless STA 115 may be stationary or mobile.

Although not shown in FIG. 1, a wireless STA 115 may be covered by more than one AP 105 and therefore may associate with one or more APs 105 at different times. A single AP 105 and an associated set of STAs may be referred to as a basic service set (BSS). An extended service set (ESS) is a set of connected BSSs. A distribution system (DS) (not shown) may be used to connect APs 105 in an extended service set. The geographic coverage area 110 for the AP 105 may be divided into sectors making up a portion of the coverage area (not shown). The WLAN 100 may include APs 105 of different types (e.g., metropolitan area, home network, etc.), with varying sizes of coverage areas and overlapping coverage areas for different technologies. Although not shown, other wireless devices may communicate with the AP 105.

While the wireless STAs 115 may communicate with each other through the AP 105 using communication links 120, each wireless STA 115 may also communicate directly with one or more other wireless STAs 115 via a direct wireless link 125. Two or more wireless STAs 115 may communicate via the direct wireless link 125 when both wireless STAs 115 are in the AP geographic coverage area 110 or when one or neither wireless STA 115 is within the AP geographic coverage area 110 (not shown). Examples of the direct wireless link 125 may include Wi-Fi Direct connections, connections established by using a Wi-Fi Tunneled Direct Link Setup (TDLS) link, and other P2P group connections. The wireless STAs 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11 ad, 802.11 ah, etc. In other implementations, other peer-to-peer connections and/or ad hoc networks may be implemented within WLAN 100.

As discussed above, each of the STAs 115, such as STA 115-a may employ an ITO for power savings. Thus, the STA 115-a may include an ITO manager 130 to set the ITO. As described herein, the ITO manager 130 may set the ITO using DCF information. For example, the DCF information may be used to calculate, generate or otherwise determine a channel congestion metric, which may be used by the ITO manager 130 to set the ITO for the STA 115-a.

Figure 2:
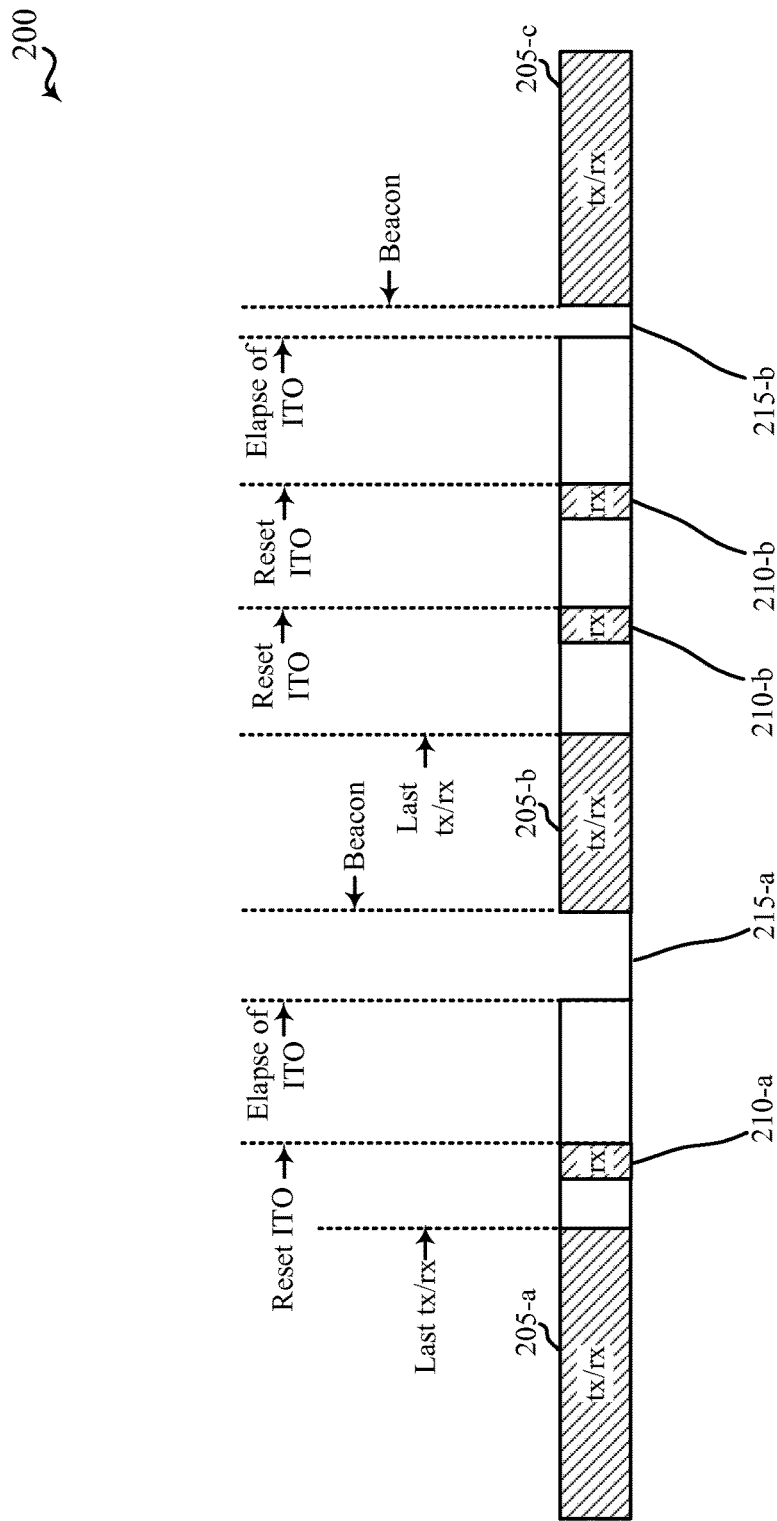
FIG. 2 shows a timing diagram illustrating an implementation of power saving for a device using an inactivity timeout (ITO), in accordance with various aspects of the present disclosure.

FIG. 2 shows a timing diagram 200 illustrating an implementation of power saving for a device, such as the STA 115-a described with reference to FIG. 1, using an ITO. The device may initially be in an awake mode for an awake interval 205-a in which the device transmits and/or receives communications (e.g., packets of information). An inactivity time interval or ITO begins after a last transmission or reception (tx/rx). In this example, the ITO may be for a relatively long period of time (e.g., as a percentage of the beacon interval, etc.). The ITO is reset upon reception (rx) 210-a of any further communications within the ITO. Once the ITO has elapsed, the device enters a sleep mode for a sleep interval 215-a, which may last until the device has data to transmit or receives a beacon from the AP, such as the AP 105 described with reference to FIG. 1, indicating that the AP has data for the device. The beacon interval is the time (e.g., ms) between beacons which contain information about the network and synchronize the wireless network.

After receiving the beacon, the device may exit the sleep mode and enter the awake mode for another awake interval 205-b, for example, when the device has information to transmit or the AP has information to transmit to the device. Again, the ITO begins after a last transmission or reception (tx/rx). Again, the ITO is reset upon reception(s) 210-b of any further communications. Once the ITO has elapsed, the device enters a sleep mode for another sleep interval 215-b until receiving another beacon from the AP, after which the device may enter the awake mode for another awake interval 205-c (assuming further communications are to occur for the device, which may be indicated with a traffic indication map (TIM) bit in the beacon).

As illustrated in the timing diagram 200, a longer time period for the ITO may improve system performance (e.g., throughput) by increasing the chances that the device will still be in the awake mode when further communications (e.g., 210-a, 210-b) occur. On the other hand, a longer time period for the ITO may forfeit power saving opportunities by delaying entry of the device into the sleep mode. As described herein, the ITO for the device may be determined (e.g., set) in a manner that takes into account traffic conditions, for example, using DCF information of the device.

Figure 3:
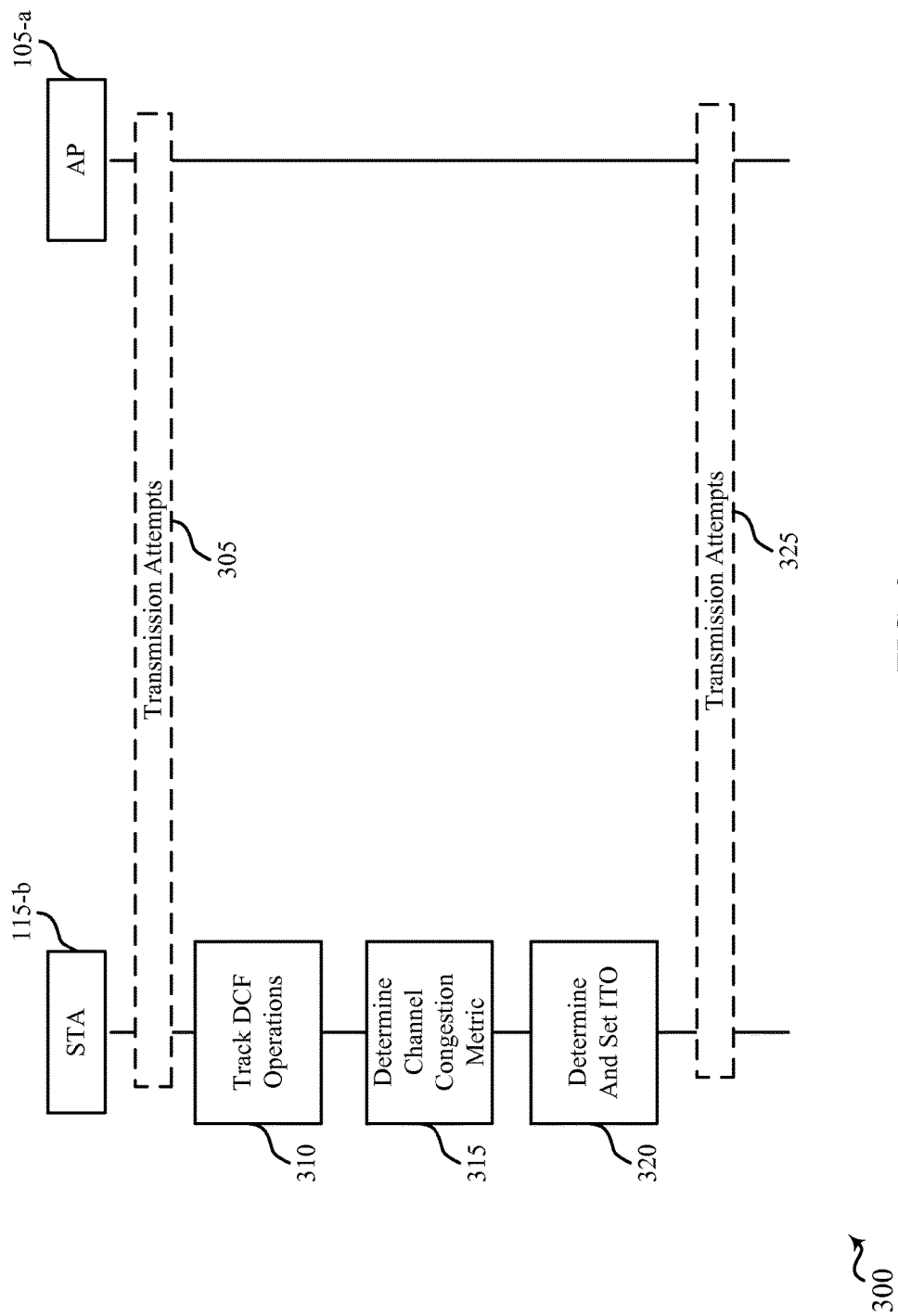
FIG. 3 shows a block diagram illustrating an example of a process flow for setting an ITO for a device, in accordance with various aspects of the present disclosure.

FIG. 3 shows a block diagram 300 illustrating an example of a process flow for setting an ITO for a STA 115-b, in accordance with various aspects of the present disclosure. The STA 115-b may be an example of one of the STAs 115 described with reference to FIG. 1, such as the STA 115-a including the ITO manager 130. In this example, the STA 115-b is shown communicating with an AP 105-a, which may be an example of the AP 105 described with reference to FIG. 1. It should be understood, however, that the STA 115-b may communicate with multiple devices (e.g., STAs, APs, etc.) and that the single AP 105 is shown for the sake of simplicity.

At 305, the STA 115-b may make a plurality of transmission attempts, for example, to send information (e.g., data) to the AP 105-a. Some of the transmission attempts may be unsuccessful and some may be successful.

At 310, the STA 115-b may track DCF operations regarding the plurality of transmission attempts to obtain historical DCF information. While this aspect of the process is illustrated as occurring later in time, it should be understood that the tracking may be concurrent (or nearly concurrent) with the transmission attempts at 305.

The historical DCF information may include historical contention window (CW) data for the STA 115-b. As such, tracking the DCF operations may involve tracking a random backoff interval value for each of a plurality of prior CWs employed by the STA 115-b. Tracking the DCF operations also may involve determining a number of times a backoff timer is paused during transmission attempts for each of the plurality of prior CWs.

The random backoff interval value may be defined according to the equations:

$$\mathrm{RandBO}(k) = [1 \ldots \mathrm{CW}(k)]$$

$$\mathrm{CW}(k) = 2^k - 1$$

where RandBO(k) is the random backoff interval value (e.g., random number) generated for the kth contention window, CW(k).

Table I shows an example of historical DCF information including random backoff interval values (RandBO) and total pause counts for each CW. The values of the CWs and the number of CWs may be implementation specific, or may be set in accordance with an industry standard. The random backoff interval values (RandBO) are determined randomly in accordance with the value of the respective CW, and will vary in actual practice of DCF operations. The pause count also will vary in actual practice of DCF operations in accordance with how busy the medium is during transmission attempts by the STA 115-b.

TABLE I

|  | CW = 15 | CW = 31 | CW = 63 | CW = 127 | CW = 255 | CW = 511 | CW = 1023 |
| --- | --- | --- | --- | --- | --- | --- | --- |
| RandBO | 7 | 19 | 52 | 43 | 211 | 0 | 0 |
| Pause Count | 0 | 10 | 12 | 5 | 30 | 0 | 0 |

At 315, the STA 115-b may determine a channel congestion metric using the historical DCF information. The STA 115-b may, for example, determine a channel congestion sample for each of the plurality of prior CWs based at least in part on the random backoff interval value and the determined number of times the backoff timer is paused. In such case, the channel congestion metric may be determined using a plurality of the determined channel congestion samples. A desired number of most recent channel congestion samples may be used for the plurality. The desired number may be predetermined or may be adaptive, for example, to take into account samples that are sufficiently relevant (e.g., having occurred within a certain time frame of determining the channel congestion metric or determining the ITO, as discussed below). Further, the STA 115-b may associate each channel congestion sample with a timestamp of the corresponding CW.

Each channel congestion sample may be determined according to the equation:

$$\text{Sample}(k) = \Sigma_{i=0}^{n} \log_2(\text{RandBO}(i)) * \text{Coeff}(k) + f_{limit}(\text{Pt}(i))$$

where Sample(k) is the channel congestion sample for the kth contention window, Coeff(k) is a coefficient associated with the kth contention window, and Pt(i) is the total pause time. The total pause time may be determined according to the equation:

$$\text{Pt}(k) = \Sigma_{i=0}^{n} \text{slot\_time} * \text{slot}(i)$$

where Pt(k) is the total pause time for the contention window k, slot_time is the amount of time of each slot, and slot(i) is the number of paused slots.

At 320, the STA 115-b may determine an ITO for the STA 115-b. The ITO may be determined using the channel congestion metric. As noted above, the ITO may be determined using a plurality of the determined channel congestion samples. In such case, the corresponding timestamps of the congestion samples and a current timestamp may also be used by the STA 115-b in determining the ITO. The new ITO may be calculated according to the equation:

$$\text{ITO} = \Sigma_{i=0}^{n} \text{Sample}(i) / (\text{TScurrent} - \text{TS}i)$$

where n is the number of sample metrics, TSi is the timestamp associated with the individual samples Sample(i), and TScurrent is the timestamp when the ITO is generated.

Thus, as described above and further herein, the ITO may be set adaptively using historical DCF information. As illustrated in FIG. 3, the process of setting the ITO may be performed again using DCF information from transmission attempts 325. Repetition of the process may after a certain number of transmission attempts are made, periodically, or as often as appropriate or desired for a particular implementation.

Figure 4:
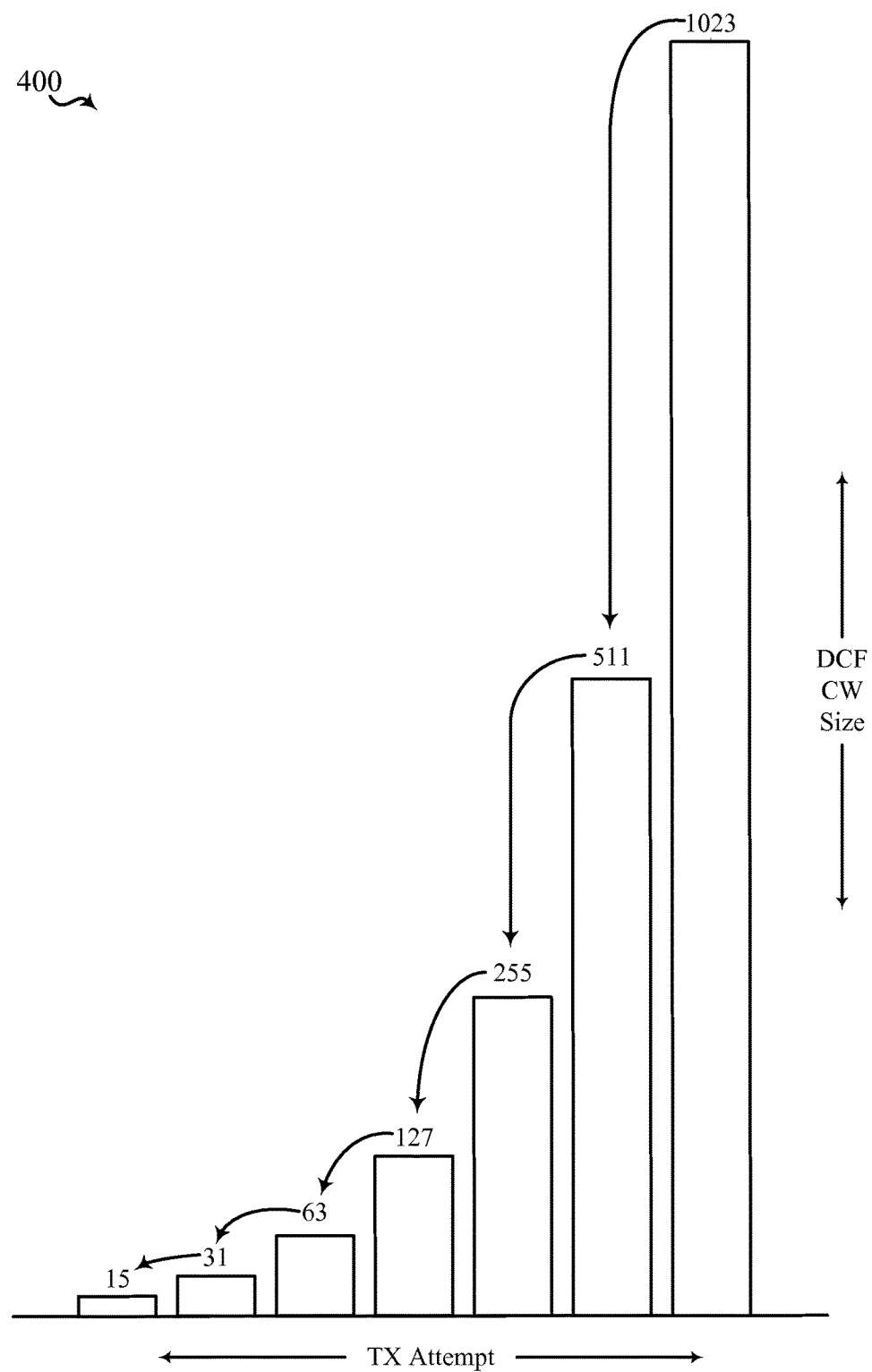
FIG. 4 shows a diagram illustrating an example of distributed coordination function (DCF) contention windows (CWs), in accordance with various aspects of the present disclosure.

FIG. 4 shows a diagram illustrating an example of DCF contention windows (CWs), in accordance with various aspects of the present disclosure. As noted above, the values of the CWs and the number of CWs may be implementation specific, or may be set in accordance with an industry standard. Further, when a transmission attempt (e.g., for sending data) fails, the CW employed for a next transmission attempt (e.g., for sending the data) is stepped to the next higher CW. As such, in accordance with the CWs shown, a first transmission attempt may be made using the CW with a value of 15. If the first transmission attempt fails, a second transmission attempt may be made using the CW with a value of 31. If the second transmission attempt fails, a third transmission attempt may be made using the CW with a value of 63, and so on, until a CW with a highest or maximum value (e.g., 1023 as shown) is employed. Conventionally, once a transmission attempt is successful, the CW for a next transmission attempt (e.g., for sending additional data) is determined by resetting the CW to the CW having the lowest value (e.g., 15 as shown).

In addition to using DCF information to determine/set the ITO for a wireless device, an approach for modifying the CW resetting procedure is contemplated. Instead of resetting the CW to the CW having the lowest value, the CW may be reset to one of the CW values in accordance with the CW value used for a previous successful transmission. For example, the CW may be reset in accordance with the CW used for the most recent successful transmission. This may involve, for example, decrementing to a next CW value relative to the CW used for the most recent successful transmission. For example, with reference to FIG. 4, if a transmission attempt employing the CW with a value of 255 is successful, the CW may be reset to the CW with a value of 127 for the next transmission attempt.

Alternatively, the CW may be reset in accordance with the CWs used for a plurality of previous successful transmissions (e.g., a history of CWs used for successful transmissions). A suitable number of previous successful transmissions may be taken into account for resetting the CW for the next transmission attempt. The suitable number may be based on a consistency of the CWs employed for successful transmissions. For example, when the CWs employed for successful transmissions varies significantly, just a few previous successful transmissions may be taken into account. On the other hand, when a history of the CWs employed for successful transmissions exhibits a trend, a number of successful transmissions representative of the trend may be considered.

Taking into account a plurality of previous successful transmissions may involve calculating an average of the associated CW values. Resetting the CW for the next transmission attempt in accordance with the four previous successful transmission attempts may be based on the calculated average. For example, with reference to FIG. 4, if four previous successful transmission attempts are considered that have associated CW values of 127, 255, 511 and 1023 (e.g., in no particular order), the average CW value may be 481.5. The CW for the next transmission attempt may be reset to the CW with a value of 255, for example, as the next CW value relative to the calculated average CW value of 481.5.

Figure 5:
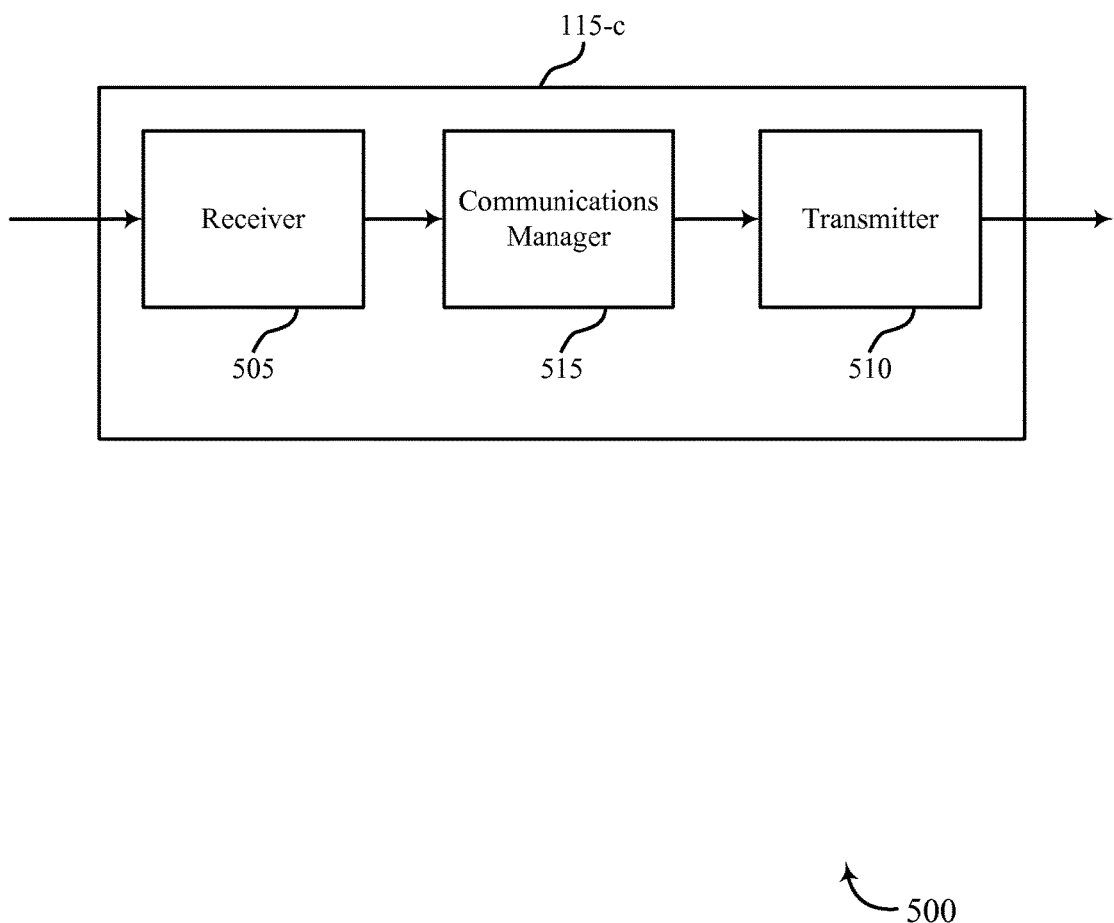
FIG. 5 shows a block diagram of an example of a device for use in wireless communication, in accordance with various aspects of the present disclosure.

FIG. 5 shows a block diagram 500 of an example of a STA 115-c for use in wireless communication, in accordance with various aspects of the present disclosure. The STA 115-*c* may be an example of aspects of one or more of the STAs 115 described with reference to FIGS. 1 and 3, and may implement various aspects described with reference to FIGS. 2 and 4. The STA 115-*c* may also be or include a processor (not shown). The STA 115-*c* may include may include a receiver 505, a transmitter 510, and/or a communications manager 515. Each of these components may be in communication with each other.

The STA 115-*c*, through the receiver 505, the transmitter 510, and/or the communications manager 515, may perform functions described herein. For example, the STA 115-*c* track DCF operations or otherwise obtain historical DCF information, determine a channel congestion metric using the historical DCF information, set an ITO using the channel congestion metric, and/or set a CW value for an initial attempt of a subsequent transmission, such as described herein.

The components of the STA 115-*c* (as well as those of other related devices/apparatus described herein) may, individually or collectively, be implemented using ASICs adapted to perform some or all of the applicable functions in hardware. Alternatively, the functions may be performed by other processing units (or cores), on integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by general or application-specific processors.

The receiver 505 may receive information such as packets, user data, and/or control information associated with various information channels (e.g., control channels, data channels, etc.). The receiver 505 also may receive acknowledgements (ACKs) in response to successful transmissions by the STA 115-*c*. Information may be passed on to the communications manager 515, and to other components of the STA 115-*c*.

The transmitter 510 may transmit signals received from other components of the STA 115-*c*. The transmitter 510 may transmit various communications (e.g., data, etc.) under control by the communications manager 515, for example. In some examples, the transmitter 510 may be collocated with the receiver 505 in a transceiver. The transmitter 510 may include a single antenna, or it may include a plurality of antennas. The transmitter 510 also may share the antenna(s) with the receiver 505.

The communications manager 515 may be used to manage wireless communication for the STA 115-*c*. For example, the communications manager 520 may be used to manage the transmitter 510 and/or the receiver 505. According to aspects of this disclosure, the communications manager 515 may manage or otherwise control setting an ITO for the STA 115-*c*. Further, the communications manager 515 may manage or otherwise control aspects of a DCF procedure, such as resetting a CW after a successful transmission attempt.

Figure 6:
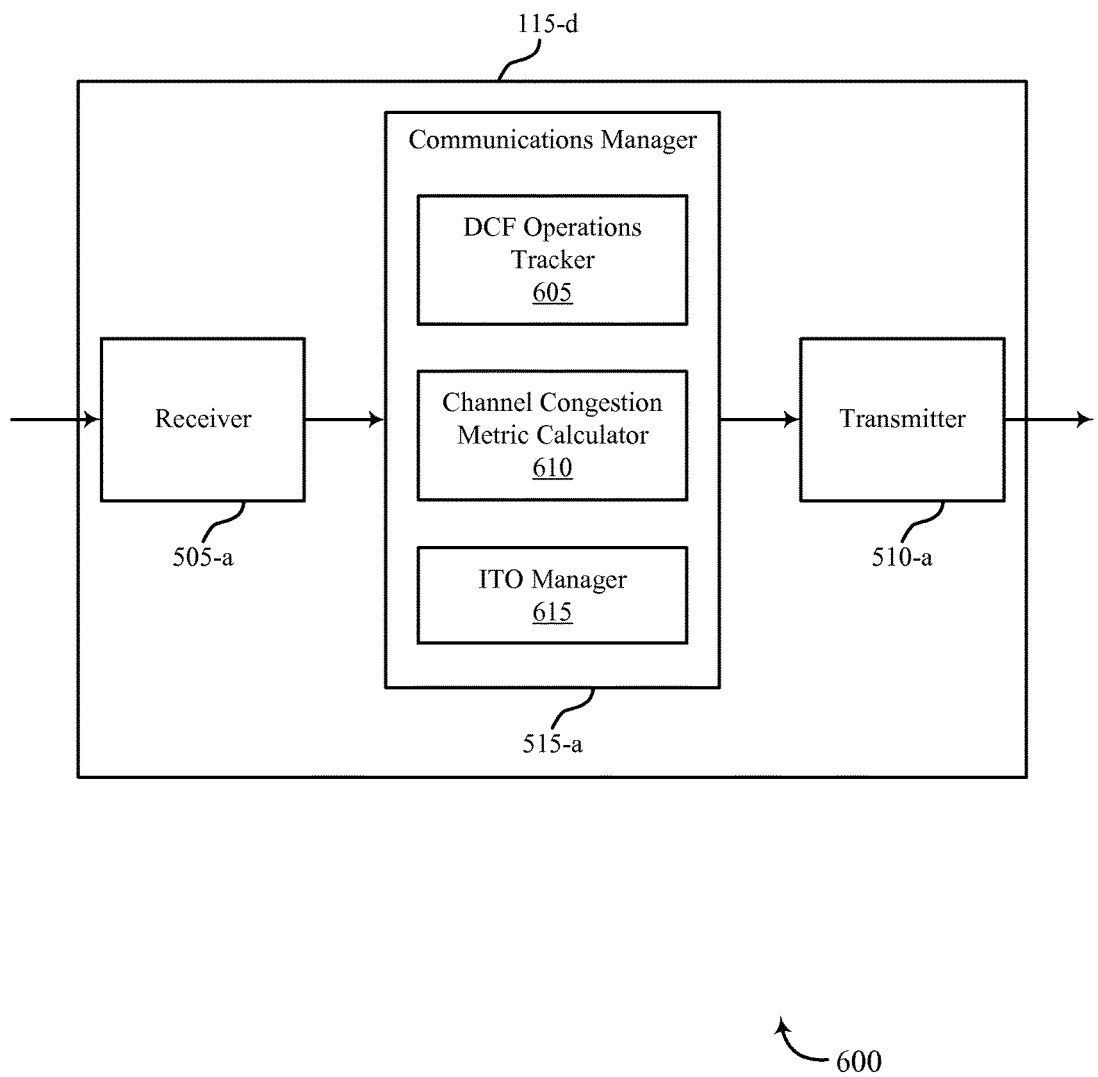
FIG. 6 shows a block diagram of another example of a device for use in wireless communication, in accordance with various aspects of the present disclosure.

FIG. 6 shows a block diagram 600 of another STA 115-*d* for use in wireless communication, in accordance with various aspects of the present disclosure. The STA 115-*d* may be an example of aspects of one or more of the STAs 115 described with reference to FIGS. 1 and 3, may implement various aspects described with reference to FIGS. 2 and 4, and may be an example of the STA 115-*c* described with reference to FIG. 5. The STA 115-*d* may also be or include a processor (not shown). The STA 115-*d* may include may include a receiver 505-*a*, a transmitter 510-*a*, and/or a communications manager 515-*a*. Each of these components may be in communication with each other.

The STA 115-*d* may perform various functions described herein. The receiver 505-*a*, the transmitter 510-*a*, and the communications manager 520-*a* may operate as described above with respect to FIG. 5, for example. The communications manager 520-*a* may include a DCF operations tracker 605, a channel congestion metric calculator 610 and an ITO manager 615.

The DCF operations tracker 605 may track details of DCF operations, such as described herein, using information from the transmitter 510-*a*, the receiver 505-*a* and/or the communications manager 515-*a*. The DCF operations tracker 605 may process the details in a suitable manner to generate a history (e.g., historical DCF information), and may assemble the history/information is a manner that is accessible/usable for channel congestion metric determination as discussed herein (e.g., in one or more tables of data).

The channel congestion metric calculator 610 may receive the history/information from the DCF operations tracker 605, or may access DCF operations tracker 605 from storage (e.g., in memory of the STA 115-*d* (not shown)). The channel congestion metric calculator 610 may perform various manipulations, determinations and/or calculations using the history/information obtained/generated by the DCF operations tracker 605 to calculate or otherwise determine a channel congestion metric and or samples, such as described herein.

The ITO manager 615 may manage the ITO for the STA 115-*d*. Such management may include, but is not limited to, setting the ITO using the congestion metric and/or samples determined by the channel congestion metric calculator 610.

Further, the communications manager 515-*a* may include various subcomponents for managing otherwise controlling aspects of a DCF procedure, such as resetting a CW after a successful transmission attempt as described herein. For example, the communications manager 515-*a* may include a DCF manager or controller (e.g., controlling the DCF process, selecting/setting the CWs used for transmission attempts, etc.), a CW history generator (e.g., tracking the CWs used for successful transmission attempts), and a CW database (e.g., storing the available/defined CW values, a CW history, etc.). For the sake of simplicity and brevity, such subcomponents are not shown in FIG. 6. Further, such subcomponents may be implemented by adapting conventional DCF hardware components to provide various functionality described herein. For example, the mechanism for resetting the CW may be accomplished by a modification of software controlling existing components and/or a modification of existing hardware used in WLAN media access control (MAC).

Figure 7A:
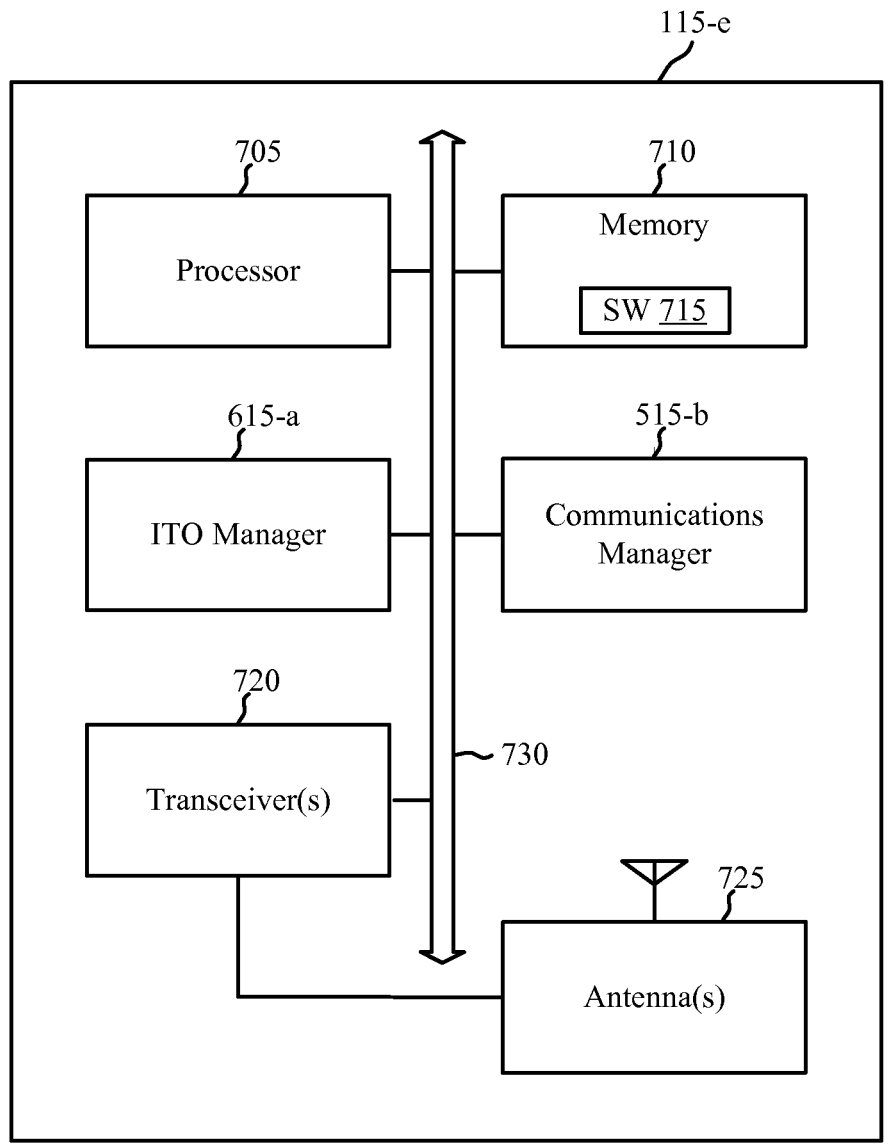
FIG. 7A shows a block diagram of an example of an apparatus for use in wireless communication, in accordance with various aspects of the present disclosure.

Turning to FIG. 7A, a block diagram 700-*a* is shown that illustrates a STA 115-*e* for use in wireless communication, in accordance with various aspects of the present disclosure. The STA 115-*e* may be an example of aspects of one or more of the STAs 115 described with reference to FIGS. 1 and 3, may implement various aspects described with reference to FIGS. 2 and 4, and may be an example of one or both of the STAs 115 described with reference to FIGS. 1, 3, 5, and 6. The STA 115-*e* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc.

The STA 115-e may have an internal power supply (not shown), such as a small battery, to facilitate mobile operation.

The STA 115-e may include a processor 705, a memory 710, at least one transceiver 720 and at least one antenna 725. Each of these components may be in communication with each other, directly or indirectly, over at least one bus 730.

The memory 710 may include random access memory (RAM) and read-only memory (ROM). The memory 710 may store computer-readable, computer-executable software (SW) code 715 containing instructions that, when executed, cause the processor 705 to perform various functions described herein, for example, for setting an ITO and/or resetting a CW. Alternatively, the software code 715 may not be directly executable by the processor 705 but may cause the STA 115-e or components thereof (e.g., when compiled and executed) to perform functions described herein.

The processor 705 may include an intelligent hardware device, e.g., a CPU, a microcontroller, an ASIC, etc. The processor 705 may process information received through the transceiver(s) 720 and/or to be sent to the transceiver(s) 720 for transmission through the antenna(s) 725. The processor 705 may handle, alone or in connection with other components, various aspects for communicating using DCF procedures, for power saving using an ITO, etc.

The transceiver(s) 720 may communicate bi-directionally with APs, STAs or other devices, such as described above with reference to FIGS. 1, 2 and 3. The transceiver(s) 720 may be implemented as at least one transmitter module and at least one separate receiver module. The transceiver(s) 720 may include a modem to modulate the packets and provide the modulated packets to the antenna(s) 725 for transmission, and to demodulate packets received from the antenna(s) 725. While the STA 115-e may include a single antenna, there may be aspects in which the STA 115-e may include multiple antennas 725.

According to the architecture of FIG. 7, the STA 115-e further may include a communications manager 515-b. The communications manager 515-b may manage communications with various APs and/or STAs, for example. The communications manager 515-b may be an example of aspects of the communications managers 515 and 515-a described with reference to FIGS. 5 and 6, respectively. The communications manager 515-b may be a component of the STA 115-e in communication with some or all of the other components of the STA 115-e over the bus 730. Alternatively, functionality of the communications manager 515-b may be implemented as a component of the transceiver(s) 720, as a computer program product, and/or as at least one controller element of the processor 705.

The STA 115-e also may include an ITO manager 615-a. The ITO manager 615-a may be an example of aspects of the ITO manager 615 described with reference to FIG. 6. The ITO manager 615-a may be a component of the STA 115-e in communication with some or all of the other components of the STA 115-e over the bus 730. Alternatively, functionality of the ITO manager 615-a may be implemented as a component of the transceiver(s) 720, as a computer program product, and/or as at least one controller element of the processor 705.

The components of the STA 115-e may implement aspects discussed above with respect to FIGS. 5 and 6, and those aspects may not be repeated here for the sake of brevity. Moreover, the components of the STA 115-e may implement aspects discussed below with respect to FIGS. 8, 9 and 10, and those aspects may not be repeated here also for the sake of brevity.

Figure 7B:
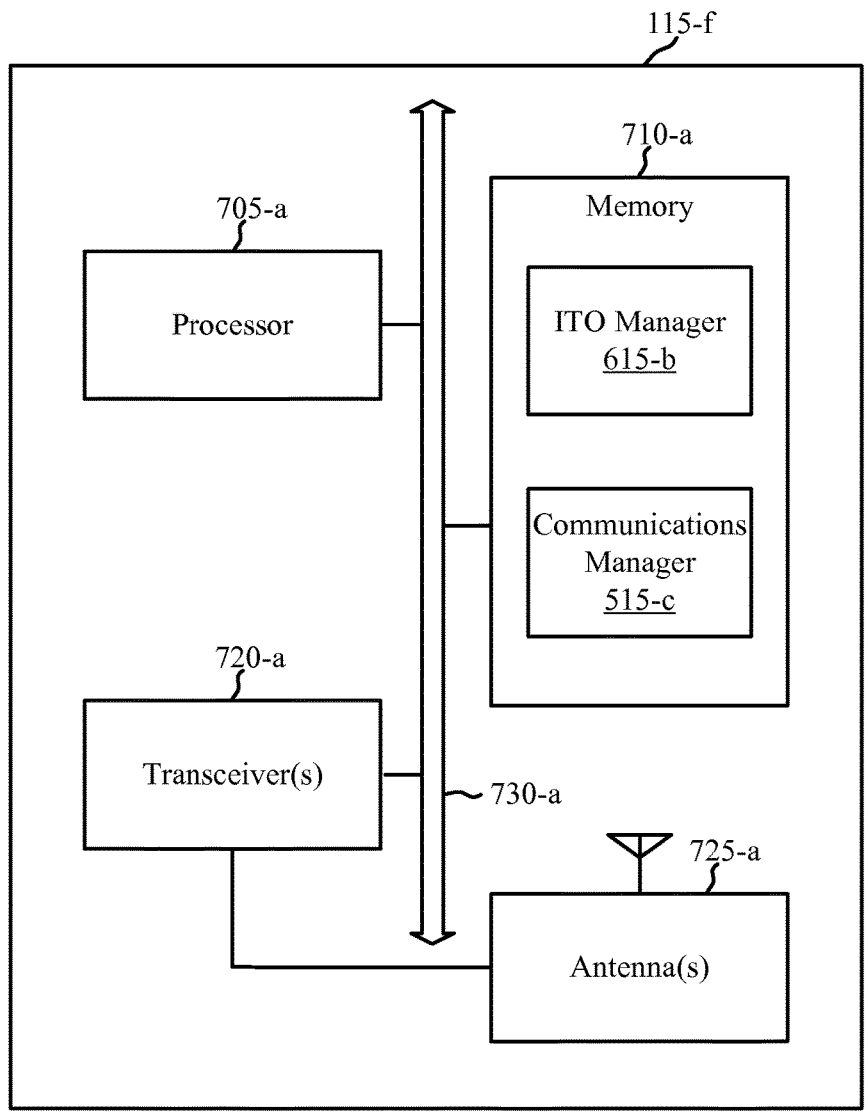
FIG. 7B shows a block diagram of another example of an apparatus for use in wireless communication, in accordance with various aspects of the present disclosure.

Turning to FIG. 7B, a block diagram 700-b is shown that illustrates a STA 115-f for use in wireless communication, in accordance with various aspects of the present disclosure. The STA 115-f may be an example of aspects of one or more of the STAs 115 described with reference to FIGS. 1, 3, 5, and 6, and 7A, and may implement various aspects described with reference to FIGS. 2 and 4. The STA 115-f may include a processor 705-a, a memory 710-a, at least one transceiver 720-a, and at least one antenna 725-a. Each of these components may be in communication, directly or indirectly, with one another (e.g., over a bus 730-a). Each of these components may perform the functions described above with reference to FIG. 7A.

In this example, the memory 710-a may include software that performs the functionality of a communications manager 515-c and an ITO manager 615-b. For example, memory 710-a may include software that, when compiled and executed, causes the processor 705-a (or other components of the STA 115-f) to perform the functionality described above and further below. A subset of the functionality of the communications manager 515-c and the ITO manager 615-b may be included in memory 710-a; alternatively, all such functionality may be implemented as software executed by the processor 705-a to cause the STA 115-f to perform such functions. Other combinations of hardware/software may be used to perform the functions of the communications manager 515-c and the ITO manager 615-b.

Figure 8:
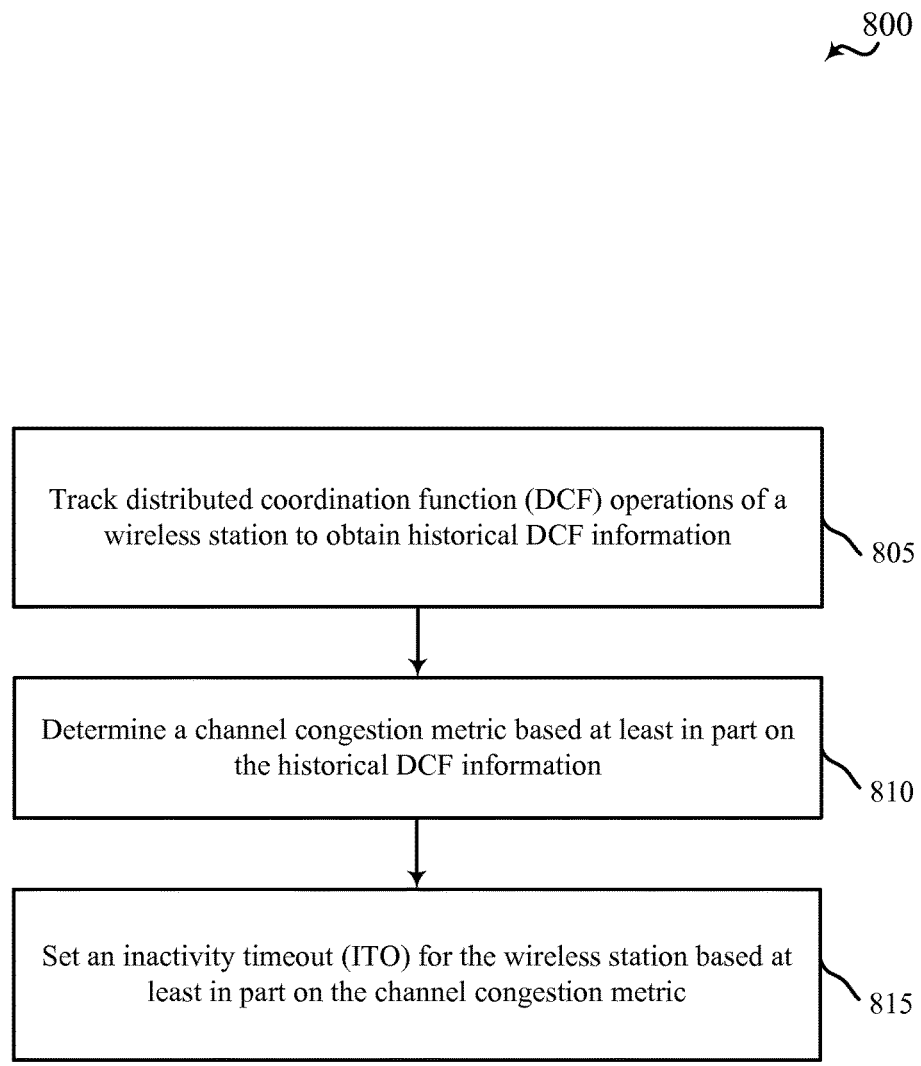
FIG. 8 shows a flow chart illustrating an example of a method for wireless communication, in accordance with various aspects of the present disclosure.

FIG. 8 shows a flow chart illustrating an example of a method 800 for wireless communication, in accordance with various aspects of the present disclosure. For clarity, the method 800 is described below with reference to aspects of one or more of the STAs 115 described with reference to FIGS. 1 and 3, one or both of the STAs 115 described with reference to FIGS. 5 and 6, or one or both of the STA 115 described with reference to FIGS. 7A and 7B. The operations of method 800 may be implemented by such a STA or components thereof, such as described above. For example, the operations of method 800 may be performed by the communications manager 515 described with reference to FIGS. 5 and 6, or a combination of the communications manager 515 and the ITO manager 615 described with reference to FIGS. 7A and 7B. The STA may execute a set of codes to control the functional elements thereof to perform the functions described below. Additionally or alternatively, the STA may perform aspects the functions described below using special-purpose hardware.

At block 805, a STA may track DCF operations to obtain historical DCF information. For example, the operation(s) at block 805 may be performed by the DCF operations tracker 605 of the communications manager 515-a as described above with reference to FIG. 6.

At block 810, the STA may determine a channel congestion metric using the historical DCF information. For example, the operation(s) at block 810 may be performed by the channel congestion metric calculator 610 of the communications manager 515-a as described above with reference to FIG. 6.

Then, at block 815, the STA may set an ITO using the channel congestion metric. For example, the operation(s) at block 815 may be performed by the ITO manager 615 of the communications manager 515-a as described above with reference to FIG. 6.

Figure 9:
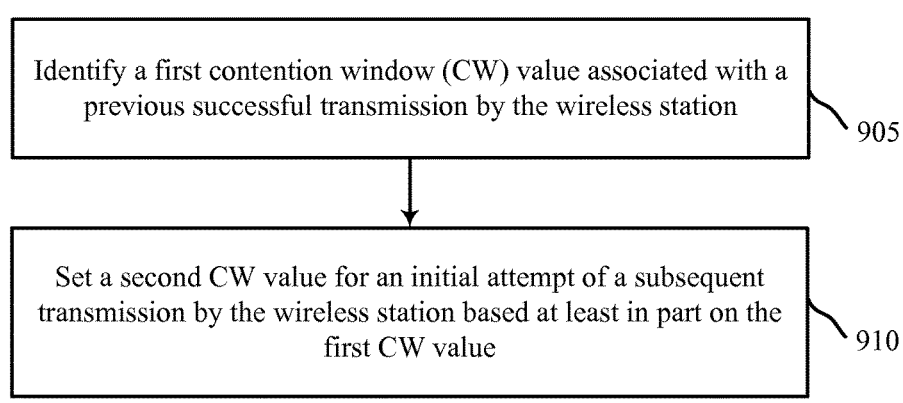
FIG. 9 shows a flow chart illustrating another example of a method for wireless communication, in accordance with various aspects of the present disclosure.

FIG. 9 shows a flow chart illustrating another example of a method 900 for wireless communication, in accordance with various aspects of the present disclosure. For clarity, the method 900 is described below with reference to aspects of one or more of the STAs 115 described with reference to FIGS. 1, 3, 5, 6, 7A, 7B. The operations of method 900 may be implemented by such a STA or components thereof, such as described above. For example, the operations of method 900 may be performed by the communications manager 515 described with reference to FIGS. 5-7B. The STA may execute a set of codes to control the functional elements thereof to perform the functions described below. Additionally or alternatively, the STA may perform aspects the functions described below using special-purpose hardware.

At block 905, a STA may identify a first contention window (CW) value associated with a previous successful transmission by the wireless station. Such identification may be performed as part of a DCF procedure such as described herein.

Then, at block 910, the STA may set a second CW value for an initial attempt of a subsequent transmission by the wireless station based at least in part on the first CW value. Again, such setting (e.g., resetting) of the CW to be employed after a successful transmission attempt may be performed as part of a DCF procedure such as described herein.

Figure 10:
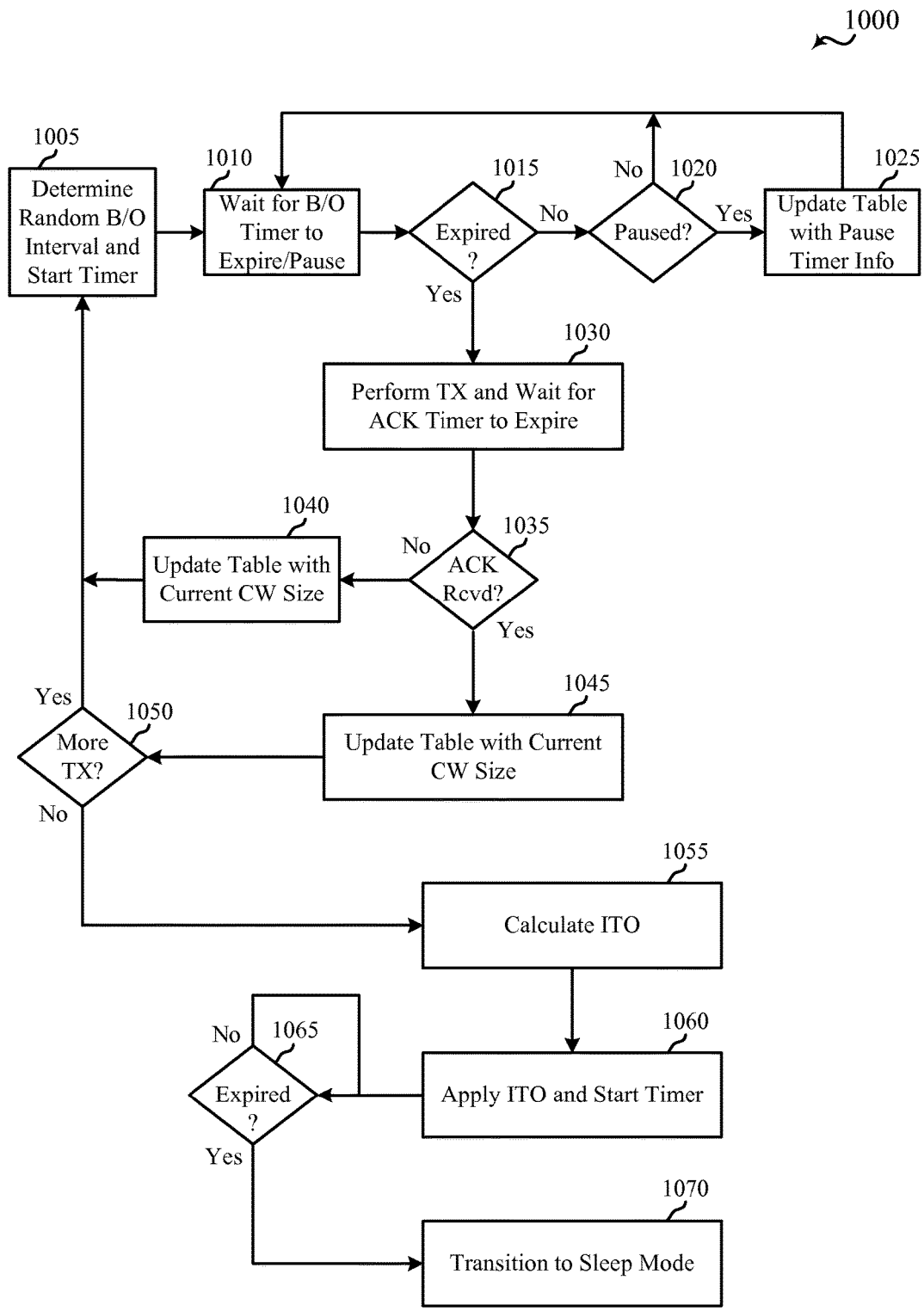
FIG. 10 shows a flow chart illustrating yet another example of a method for wireless communication, in accordance with various aspects of the present disclosure.

FIG. 10 shows a flow chart illustrating yet another example of a method 1000 for wireless communication, in accordance with various aspects of the present disclosure. For clarity, the method 1000 is described below with reference to aspects of one or more of the STAs 115 described with reference to FIGS. 1, 3, 5, 6, 7A, 7B. The operations of method 1000 may be implemented by such a STA or components thereof, such as described above. For example, the operations of method 1000 may be performed by the communications manager 515 described with reference to FIGS. 5 and 6, or a combination of the communications manager 515 and the ITO manager 615 described with reference to FIGS. 7A and 7B. The STA may execute a set of codes to control the functional elements thereof to perform the functions described below. Additionally or alternatively, the STA may perform aspects the functions described below using special-purpose hardware.

The method 1000 may provide a modified DCF based procedure in which an ITO is set adaptively and a CW to be employed after a successful transmission attempt is set in accordance with the CW(s) associated with previous successful transmission attempt(s). The method 1000 may begin at block 1005 when the STA has a transmission (e.g., of data, etc.) to another device (e.g., a STA, an AP, etc.) or devices.

At block 1005, the STA may determine a random back off interval and start an associated timer (e.g., a back off timer) to implement the determined back off interval. The STA may then wait for the determined back off interval to elapse (e.g., the back off timer to expire) or pause at block 1010. Although not illustrated as a separate block in FIG. 10, the STA may use CSMA to determine whether the channel is idle during the determined back off interval.

At block 1015, the STA may determine if the back off timer is expired. If not, the method 1000 may proceed to block 1020, where the STA may determine if the back off time has been paused. If so, the method 1000 may proceed to block 1025, where the STA may increment a pause count, for example, updating a table of DCF information with pause timer information (e.g., pause count) for a CW currently being employed as part of the DCF procedure. After incrementing/updating at block 1025, the method 1000 may return to block 1010. Also, if the back off timer has not been paused, the method 1000 may return directly to block 1010 from block 1020.

Once the back off timer has expired, the method 1000 may jump from block 1015 to block 1030. At block 1030, the STA may attempt to perform the transmission and wait to receive an acknowledgement (ACK). An ACK timer may be set when the transmission has been sent form the STA. While waiting for the ACK timer to expire, the STA may, at block 1035 determine if an ACK is received in response to the sent transmission. If the ACK is not received before expiration of the ACK timer, the method may proceed to block 1040, where the STA may record DCF information associated with the current CW, for example, by updating a table. The STA may then increase the CW size (e.g., increment to the next available/defined CW) and the method may return to block 1005 to continue attempting to transmit the data using the increased/incremented CW.

If the STA receives an ACK for the sent transmission prior to expiration of the ACK timer, the method may jump from block 1035 to block 1045. At block 1045, the STA may record DCF information for the successful transmission attempt, for example, by updating a table for the CW used for the successful transmission. Then, at block 1050, the STA may determine whether more transmissions are to be performed (e.g., there is additional data at the STA to transmit). If so, the method 1000 may return to block 1005 to continue the DCF procedure for transmitting the additional data. Although not as a separate block in FIG. 10, the STA may reset the CW for an initial attempt at a subsequent transmission. As described herein, the CW may be reset, for example, in accordance with the current CW that was used for the most recent successful transmission. For example, the CW may be decremented from the current CW to a next CW available or defined.

If no more transmissions are to be performed (e.g., no additional data for transmission is pending at the STA), the method 1000 may continue from block 1050 to block 1055. At block 1055, the STA may calculate or otherwise determine an ITO to employ. As described herein, such calculation/determination may be performed using historical DCF information collected during previous transmission attempts.

Once the ITO is calculated/determined, the method 1000 may proceed to block 1060, where ITO may be set (e.g., applied) and an ITO timer may be started to implement the ITO. The STA may employ the ITO such as described with reference to FIG. 2, for example. The method 1000 may continue from block 1060 to block 1065, where the STA may determine if the ITO has elapsed (e.g., the ITO timer has expired). If not, the STA may continue to wait in an awake state until the ITO has elapsed.

Once the ITO has elapsed, the method may proceed from block 1065 to block 1070, where the STA may transition to a sleep or low-power mode, for example, to conserve power. As noted above, the STA may remain in the sleep mode until the STA wakes up to receive a beacon from an AP, for example.

The methods 800, 900 and 1000 may provide for wireless communications at a STA or similar device. It should be noted that these methods are just example implementations and that the operations of thereof may be rearranged or otherwise modified such that other implementations are possible. For example, aspects from two or more of the methods 800, 900 and 1000 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication by a wireless station, comprising:
    tracking distributed coordination function (DCF) operations of the wireless station to obtain historical DCF information, wherein the historical DCF information comprises a number of times a backoff timer is paused during transmission attempts for each of a plurality of prior contention windows (CWs) of the wireless station;
    determining a channel congestion metric based at least in part on the number of times the backoff timer is paused of the historical DCF information; and
    adaptively setting an inactivity timeout (ITO) for the wireless station based at least in part on the channel congestion metric, wherein the ITO defines an inactivity time interval for the wireless station to remain in an awake mode after a last transmission or reception of data traffic before entering a sleep mode.

2. The method of claim 1, wherein the ITO is inversely proportional to a degree of channel congestion indicated by the channel congestion metric.

3. The method of claim 1, wherein the historical DCF information comprises historical contention window (CW) data for the wireless station.

4. The method of claim 3, wherein tracking the DCF operations comprises:
    tracking a random backoff interval value for each of the plurality of prior CWs of the wireless station.

5. The method of claim 4, further comprising:
    determining a channel congestion sample for each of the plurality of prior CWs based at least in part on the random backoff interval value and the number of times the backoff timer is paused;
wherein the channel congestion metric for the wireless station is based at least in part on a plurality of the determined channel congestion samples.

6. The method of claim 5, further comprising:
associating each channel congestion sample with a timestamp of the corresponding CW;
wherein the ITO for the wireless station is based at least in part on the plurality of the determined channel congestion samples, the corresponding timestamps of the congestion samples and a current timestamp.

7. The method of claim 1, further comprising:
identifying a first contention window (CW) value associated with a previous successful transmission by the wireless station; and
setting a second CW value for an initial attempt of a subsequent transmission by the wireless station based at least in part on the first CW value.

8. The method of claim 7, wherein setting the second CW value comprises:
decrementing to a next CW value relative to the first CW value.

9. An apparatus for wireless communication, comprising:
a processor to track distributed coordination function (DCF) operations of a wireless station to obtain historical DCF information, wherein the historical DCF information comprises a number of times a backoff timer is paused during transmission attempts for each of a plurality of prior contention windows (CWs) of the wireless station;
a calculator to determine a channel congestion metric based at least in part on the number of times the backoff timer is paused of the historical DCF information; and
an inactivity timeout (ITO) manager to adaptively set an ITO for the wireless station based at least in part on the channel congestion metric, wherein the ITO defines an inactivity time interval for the wireless station to remain in an awake mode after a last transmission or reception of data traffic before entering a sleep mode.

10. The apparatus of claim 9, wherein the historical DCF information comprises historical contention window (CW) data for the wireless station.

11. The apparatus of claim 10, wherein the processor tracks the DCF operations by tracking a random backoff interval value for each of the plurality of prior CWs of the wireless station.

12. The apparatus of claim 11, wherein the calculator further determines a channel congestion sample for each of the plurality of prior CWs based at least in part on the random backoff interval value and the number of times the backoff timer is paused, and determines the channel congestion metric for the wireless station based at least in part on a plurality of the determined channel congestion samples.

13. The apparatus of claim 12, wherein:
the processor further associates each channel congestion sample with a timestamp of the corresponding CW; and
the ITO manager sets the ITO for the wireless station based at least in part on the plurality of the determined channel congestion samples, the corresponding timestamps of the congestion samples and a current timestamp.

14. The apparatus of claim 9, wherein the processor further identifies a first contention window (CW) value associated with a previous successful transmission by the wireless station, further comprising:
a DCF manager to set a second CW value for an initial attempt of a subsequent transmission by the wireless station based at least in part on the first CW value.

15. The apparatus of claim 14, wherein the DCF manager sets the second CW value by decrementing to a next CW value relative to the first CW value.

16. An apparatus for wireless communication, comprising:
means for tracking distributed coordination function (DCF) operations of a wireless station to obtain historical DCF information, wherein the historical DCF information comprises a number of times a backoff timer is paused during transmission attempts for each of a plurality of prior contention windows (CWs) of the wireless station;
means for determining a channel congestion metric based at least in part on the number of times the backoff timer is paused of the historical DCF information; and
means for adaptively setting an inactivity timeout (ITO) for the wireless station based at least in part on the channel congestion metric, wherein the ITO defines an inactivity time interval for the wireless station to remain in an awake mode after a last transmission or reception of data traffic before entering a sleep mode.

17. The apparatus of claim 16, further comprising:
means for tracking a random backoff interval value for each of the plurality of prior CWs of the wireless station.

18. The apparatus of claim 16, wherein the ITO is inversely proportional to a degree of channel congestion indicated by the channel congestion metric.

19. The apparatus of claim 17, further comprising:
means for determining a channel congestion sample for each of the plurality of prior CWs based at least in part on the random backoff interval value and the number of times the backoff timer is paused;
wherein the channel congestion metric for the wireless station is based at least in part on a plurality of the determined channel congestion samples.

20. The apparatus of claim 19, further comprising:
means for associating each channel congestion sample with a timestamp of the corresponding CW;
wherein the ITO for the wireless station is based at least in part on the plurality of the determined channel congestion samples, the corresponding timestamps of the congestion samples and a current timestamp.

* * * * *